(12) United States Patent
Volin (10) Patent No.: US 9,313,956 B2
(45) Date of Patent: Apr. 19, 2016

(54) GARDEN-BORDER SYSTEM WITH COUPLERS, STAKES, AND PINS

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 30 days.

(21) Appl. No.: 14/161,688

(22) Filed: Jan. 23, 2014

(65) Prior Publication Data

US 2014/0208644 A1    Jul. 31, 2014

Related U.S. Application Data

(60) Provisional application No. 61/758,126, filed on Jan. 29, 2013.

(51) Int. Cl.
     *A01G 1/08*            (2006.01)

(52) U.S. Cl.
     CPC ........................................ *A01G 1/08* (2013.01)

(58) Field of Classification Search
     CPC ............................................................ A01G 1/08
     USPC ............. 47/33; 404/7, 8; 52/713, 745.21, 102
     See application file for complete search history.

(56) References Cited

U.S. PATENT DOCUMENTS

| | | |
|---|---|---|
| 4,237,653 A | 12/1980 | Cortez |
| 4,924,623 A | 5/1990 | Van Rens |
| 5,040,328 A | 8/1991 | Coon |
| 5,259,154 A | 11/1993 | Lilley |
| 5,375,369 A | 12/1994 | VerHoeve |
| 5,675,930 A * | 10/1997 | Cooper ..................... A01G 1/08 404/7 |
| 5,852,895 A | 12/1998 | Sinanan |
| 5,901,526 A | 5/1999 | Vidmar |
| 6,085,458 A | 7/2000 | Gau |
| 6,379,078 B1 * | 4/2002 | Zwier ................... E01C 11/221 404/4 |
| 6,622,423 B1 | 9/2003 | Riccardi |
| 6,938,369 B2 | 9/2005 | Zwier |
| 6,944,998 B1 | 9/2005 | King |
| 7,159,367 B1 | 1/2007 | King |
| 7,424,787 B2 | 9/2008 | Singer |
| 7,533,488 B2 | 5/2009 | Singer |
| 7,966,766 B2 | 6/2011 | Vogler |
| 8,157,991 B2 | 4/2012 | Wilhelms |
| 8,387,323 B2 | 3/2013 | Mickelson |
| 8,407,948 B1 * | 4/2013 | Nash ....................... E02D 27/00 52/102 |
| 8,490,359 B2 | 7/2013 | Perotti |
| 8,528,249 B1 * | 9/2013 | Kao ......................... A01G 1/08 47/33 |
| 2014/0290132 A1 * | 10/2014 | Bent ........................ A01G 1/08 47/33 |

* cited by examiner

*Primary Examiner* — William Gilbert

(57) ABSTRACT

A unique garden-border system, for sealing the soil and water inside a garden bed, for anchoring a garden bed on a slope, and for forming a staircase-like garden bed on a slope, comprises garden-bed strips having staircase-forming openings and swing-preventing teeth stamped therein, gap-eliminating couplers having slanted-stake tunnels and strip recesses molded therein for coupling the garden-bed strips, multi-function locking pins for locking the garden-bed strips to the gap-eliminating couplers at desired angles and elevations, and anti-sliding V-shaped stakes having underground-interlocking anchors molded thereon for being inserted through the slanted-stake tunnels of the gap-eliminating couplers, to form desired shapes and elevations of the unique garden-border system.

20 Claims, 11 Drawing Sheets

GARDEN-BORDER SYSTEM WITH COUPLERS, STAKES, AND PINS

BACKGROUND OF THE INVENTION

1) Field of the Invention

The present invention relates to a unique garden-border system for sealing the soil and water inside a garden bed, for anchoring a garden bed on a slope, and for forming a staircase-like garden bed on a slope. Particularly, the present invention relates to a unique garden-border system, having gap-eliminating couplers, underground-interlocking anchors, anti-sliding slanted stakes, staircase-forming openings, swing-preventing teeth, and multi-function locking pins.

2) Description of the Prior Art

A number of inventions have been introduced.

U.S. Pat. No. 4,237,653, filed Nov. 24, 1978, to Cortez, Reynaldo; U.S. Pat. No. 4,924,623, filed May 6, 1988, to Van Rens, Jan L. M.; U.S. Pat. No. 5,040,328, filed Jan. 16, 1990, to Coon, Gerald L.; U.S. Pat. No. 5,259,154, filed Feb. 14, 1992, to Lilley, Eugene H.; U.S. Pat. No. 5,375,369, filed Apr. 20, 1992, to VerHoeve, Daniel L.; U.S. Pat. No. 5,852,895, filed May 8, 1997, to Sinanan, Terry; U.S. Pat. No. 5,901,526, filed Apr. 30, 1996, to Vidmar, James; U.S. Pat. No. 6,085,458, filed Dec. 31, 1997, to Gau, Larry J.; U.S. Pat. No. 6,622,423, filed Apr. 9, 2002, to Riccardi, Victor; U.S. Pat. No. 6,938,369, filed Jul. 25, 2003, to Zwier, Daniel G.; U.S. Pat. No. 6,944,998, filed Aug. 6, 2002, to King, John; U.S. Pat. No. 7,159,367, filed Jul. 16, 2003, to King, John; U.S. Pat. No. 7,424,787, filed Mar. 4, 2005, to Singer, Lisa R.; U.S. Pat. No. 7,533,488, filed Aug. 26, 2008, to Singer, Lisa R.; U.S. Pat. No. 7,966,766, filed Mar. 24, 2009, to Vogler, Michael R.; U.S. Pat. No. 8,157,991, filed Nov. 20, 2009, to Wilhelms, Paul; U.S. Pat. No. 8,387,323, filed Sep. 9, 2008, to Mickelson, Richard A.; and U.S. Pat. No. 8,490,359, filed Aug. 5, 2011, to Perotti, Joan M. disclose a variety of inventions related to garden borders and garden-border couplers.

The prior art has failed to solve many problems associated with such garden borders and garden-border couplers, as follows:

1) The prior-art inventions have the problem of creating gaps between their garden borders, garden-border couplers, and the ground on uneven surfaces. This lets soil and water leak out through them.
2) The prior-art inventions' stakes do not prevent their garden bed from sliding downwards. This will not retain the intended shape of their garden bed after a period of time in service.
3) The prior-art inventions do not have effective securing devices to prevent their garden bed from sliding downwards. The intended shape of their garden bed will be distorted over time.
4) The prior-art inventions cannot elevate each section of their garden borders and garden-border couplers of a garden bed without creating gaps between the sections and the ground.
5) After being assembled, the prior-art inventions do not provide any devices to prevent their garden borders and garden-border couplers from turning loose, moving, and changing position and location, by the affects of weather elements such as rain and snow, or by the affects of being stepped on, after a period of time in service.
6) After being assembled, the prior-art inventions do not provide any devices to prevent their screws from unscrewing themselves, unlocking themselves, turning loose, moving, and changing position, by the affects of weather elements such as temperature and rain, or by the affects of being stepped on, after a period of time in service.

OBJECTS AND ADVANTAGES OF THE INVENTION

The present invention substantially departs from the conventional concepts and designs of the prior art. In doing so, the present invention provides a unique gap-eliminating, underground-anchoring, anti-sliding, staircase-forming, and swing-preventing system of garden border, having many unique and significant features, functions, and advantages, which overcome all the disadvantages of the prior art, as follows:

1) It is an object of the present invention to provide the unique garden-border system having a plurality of multi-function gap-eliminating couplers, each of which is capable of, at the same time, performing double-functions of: a) Coupling garden-bed strips, and b) Eliminating all the gaps between the multi-function gap-eliminating couplers, the garden-bed strips, and the ground to seal the soil and water inside a garden bed within the garden-border system. As a result, this prevents the soil and water from leaking through all the gaps between the multi-function gap-eliminating couplers, the garden-bed strips, and the ground, and leaking out of a garden bed.

2) It is another object of the present invention to provide the unique garden-border system having a plurality of underground-interlocking anchors, which are capable of the interlocking gap-eliminating couplers of the unique garden-border system with the ground. As a result, this prevent the gap-eliminating couplers from being pried upwards when the garden-bed strips are stepped on and/or when they are affected by weather elements, after an extended period of use.

3) It is a further object of the present invention to provide the unique garden-border system having a plurality of anti-sliding V-shaped stakes, which are capable of be inserted through the gap-eliminating couplers of the unique garden-border system and through the ground, in desired angles, respectively, and are capable of interlocking the unique garden-border system and the slanted ground. As a result, this prevents the unique garden-border system from sliding down the slanted ground when stepped on and/or when it rains, after an extended period of use.

4) It is an even further object of the present invention to provide the unique garden-border system having a plurality of staircase-forming openings formed in the garden-bed strips of the unique garden-border system, which are capable of being repositioned and locked in place to form a staircase-like elevations for the garden-bed strips of the unique garden-border system. As a result, this allows people to build a garden bed on a staircase-like slope.

5) It is still another object of the present invention to provide the unique garden-border system having a plurality of swing-preventing teeth, which are molded along the edges of the staircase-forming openings, respectively, to lock the garden-bed strips of the unique garden-border system in place, to prevent the garden-bed strips from swinging downwards or upwards when stepped on and/or when they are affected by weather elements, after an extended period of use. As a result, this retains the original, intended shape and/or elevation of a garden bed.

6) It is yet another object of the present invention to provide the unique garden-border system having a plurality of multi-function locking pins, which are capable of locking the swing-preventing teeth of the garden-bed strips in place after the garden-bed strips are adjusted to desired positions and elevations, and are capable of locking themselves in place. As a result, this retains the original, intended shape and/or elevation of a garden bed.

7) It is still yet a further object of the present invention to provide the unique garden-border system having a plurality of multi-function locking pins, which are capable of being pushed through the pin holes of the gap-eliminating couplers, respectively, and snap-locking themselves in place by one-way-snap-locking wings, to eliminate the needs for using screws, screw-drivers, extended time, and substantial labor to build the garden-border system. As a result, this substantially reduces the time and labor needed to build the garden-border system.

8) It is still yet an even further object of the present invention to provide the unique garden-border system, which substantially reduces the production and installation costs for a garden border system, and, thus, transfers this saving to consumers to save them substantial amounts of money.

9) It is still yet another even further object of the present invention to provide the unique garden-border system, which eliminates all the gaps between the multi-function gap-eliminating couplers, the garden-bed strips, and the ground to seal the soil and water inside a garden bed within the garden-border system, to eliminate the problem of soil and water leaking out through all the gaps (such as gaps 49 and 50 in figures PRIOR ART A and B), which weakens the foundation of a garden bed, reduces the growth rate of plants, distorts the intended shape of the unique garden-border system and a garden bed, and shifts the unique garden-border system and a garden bed.

Other objects and advantages of the present invention will become apparent from a consideration of the accompanying drawings and ensuing description.

BRIEF SUMMARY OF THE INVENTION

A unique garden-border system, for sealing the soil and water inside a garden bed, for anchoring a garden bed on a slope, and for forming a staircase-like garden bed on a slope, comprises garden-bed strips having staircase-forming openings and swing-preventing teeth stamped therein, gap-eliminating couplers having slanted-stake tunnels and strip recesses molded therein for coupling the garden-bed strips, multi-function locking pins for locking the garden-bed strips to the gap-eliminating couplers at desired angles and elevations, and anti-sliding V-shaped stakes having underground-interlocking anchors molded thereon for being inserted through the slanted-stake tunnels of the gap-eliminating couplers, to form desired shapes and elevations of the unique garden-border system.

DETAILED DESCRIPTION OF THE INVENTION

Figure 23A:
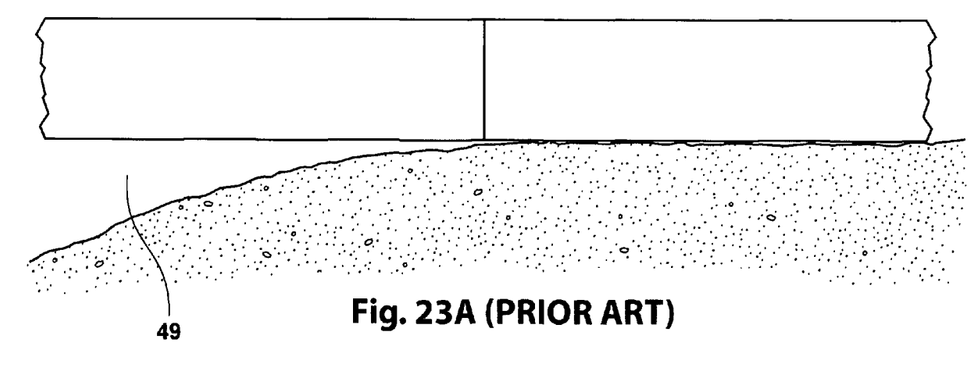
FIGS. 23A (PRIOR ART) and 23B (PRIOR ART) illustrate a common problem of gaps between garden borders and the ground.
Figure 23B:
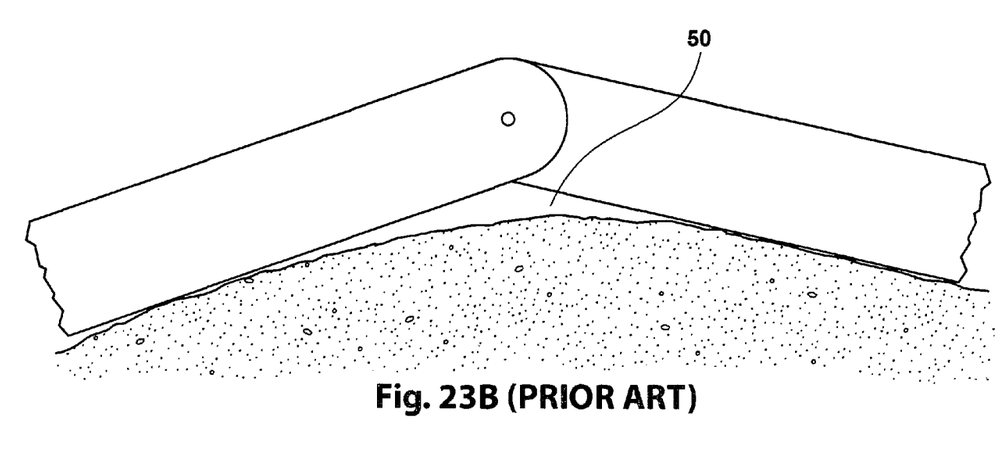

Referring to FIGS. 23A (PRIOR ART) and 23B (PRIOR ART), one of many problems prior-art inventions cannot solve is having a gap 49 (FIG. 23A (PRIOR ART) and a gap 50 (FIG. 23B (PRIOR ART) between their borders and the ground. After a period of time in use, the soil and water can leak out through gaps 49 and 50. As a result, this problem weakens the garden-bed foundation, reduces the growth rate of plants, distorts the shape of the garden bed and border, and shifts the garden bed downwards.

Component
Referring to FIGS. 1-9, the unique garden-border system comprises:
 1) Gap-eliminating couplers 51,
 2) Slanted-stake tunnels 52,
 3) Pin holes 53,
 4) Strip recesses 54,
 5) Garden-bed strips 55,
 6) Staircase-forming openings 56,
 7) Swing-preventing teeth 57,
 8) Multi-function locking pins 58,
 9) One-way-snap-locking wings 59,
 10) Anti-sliding V-shaped stakes 60, and
 11) Underground-interlocking anchors 61.
Material
Referring to FIGS. 1, 2, 3, and 4:
 1) Gap-eliminating couplers 51 are made of metallic or plasticized material.
 2) Slanted-stake tunnels 52 are made of empty space.
 3) Pin holes 53 are made of empty space.
 4) Strip recesses 54 are made of empty space.
 5) Garden-bed strips 55 are made of pliable material.
 6) Staircase-forming openings 56 are made of empty space.
 7) Swing-preventing teeth 57 are made of pliable material.
 8) Multi-function locking pins 58 are made of metallic or plasticized material.
 9) One-way-snap-locking wings 59 are made of metallic or plasticized material.
 10) Anti-sliding V-shaped stakes 60 are made of metallic or plasticized material.
 11) Underground-interlocking anchors 61 are made of metallic or plasticized material.
Shape
Referring to FIGS. 1, 2, 3, and 4:
 1) Gap-eliminating couplers 51 each have a rectangular, tile-like shape.
 2) Slanted-stake tunnels 52 each have a dumbbell shape.
 3) Pin holes 53 each have a round shape.
 4) Strip recesses 54 each have a rectangular shape.
 5) Garden-bed strips 55 each have an elongated, rectangular shape.
 6) Staircase-forming openings 56 each have a horseshoe-like shape.

7) Swing-preventing teeth 57 each have a triangular shape.
8) Multi-function locking pins 58 each have an elongated square-nail shape.
9) One-way-snap-locking wings 59 each have a fan-like shape.
10) Anti-sliding V-shaped stakes 60 each have a letter-V-like shape.
11) Underground-interlocking anchors 61 each have an arrowhead-like shape.

Connection

Referring to FIGS. 1, 2, 3, and 4:
1) Gap-eliminating couplers 51 each are pinned on an end of one garden-bed strip 55, respectively.
2) Slanted-stake tunnels 52 each are molded into one gap-eliminating coupler 51, respectively, such that it extends from the top surface to the bottom surface of one gap-eliminating coupler 51, in a desired angle.
3) Pin holes 53 each are molded into one gap-eliminating coupler 51 at a corner thereof, respectively.
4) Strip recesses 54 each are molded into one gap-eliminating coupler 51 at an end thereof, respectively.
5) Garden-bed strips 55 each are inserted into one strip recess 54, respectively.
6) Staircase-forming openings 56 each are aligned with one pin hole 53, respectively.
7) Swing-preventing teeth 57 each are molded to the edge of one of staircase-forming openings 56 and are adjusted to adjust one garden-bed strip 55 to a desired position and elevation, respectively.
8) Multi-function locking pins 58 each are pushed into one pin hole 53, respectively, to snap-lock garden-bed strips 55 to gap-eliminating couplers 51, respectively.
9) One-way-snap-locking wings 59 each are molded to one multi-function locking pins 58, respectively.
10) Anti-sliding V-shaped stakes 60 each are inserted through one slanted-stake tunnel 52 and into the ground, respectively, to interlock gap-eliminating couplers 51 and garden-bed strips 55 with the ground.
11) Underground-interlocking anchors 61 each are inserted into the ground, to interlock gap-eliminating couplers 51 and garden-bed strips 55 with the ground.

Function

Referring to FIGS. 1, 2, 3, and 4:
1) Gap-eliminating couplers 51 are for:
    a) Eliminating the gaps (such as gaps 49 and 50 in figures PRIOR ART A and B) between gap-eliminating couplers 51, garden-bed strips 55, and the ground, and
    b) Coupling garden-bed strips 55, respectively.
2) Slanted-stake tunnels 52 are for guiding anti-sliding V-shaped stakes 60 through gap-eliminating couplers 51 in desired angles, respectively.
3) Pin holes 53 are for multi-function locking pins 58 to be inserted therethrough, respectively.
4) Strip recesses 54 are for receiving garden-bed strips 55, respectively.
5) Garden-bed strips 55 are for creating a desired shape and elevation of a garden bed, and are for preventing the soil and water from leaking out of a garden bed.
6) Staircase-forming openings 56 are for allowing garden-bed strips 55 to be positioned and elevated, respectively, to create a desired shape and elevation of the unique garden-border system and a garden bed (such as, staircase-like shape and elevation).
7) Swing-preventing teeth 57 are for locking gap-eliminating couplers 51 and garden-bed strips 55 in desired positions and elevations, respectively.
8) Multi-function locking pins 58 are for locking gap-eliminating couplers 51 to garden-bed strips 55, respectively.
9) One-way-snap-locking wings 59 are for:
    a) Snap-locking multi-function locking pins 58 to gap-eliminating couplers 51, and
    b) Preventing multi-function locking pins 58 from unlocking themselves from gap-eliminating couplers 51, respectively.
10) Anti-sliding V-shaped stakes 60 are for:
    a) Preventing the unique garden-border system and a garden bed from unintendedly sliding downwards from their intended location after a period of time in use and the affect of weather elements such as rain, snow, temperature, etc., and
    b) Retaining the intended shape of the unique garden-border system and a garden bed.
11) Underground-interlocking anchors 61 are for:
    a) Interlocking the unique garden-border system with the ground, to anchor the unique garden-border system and a garden bed at their intended location, and
    b) Retaining the intended shape of the unique garden-border system and a garden bed.

Operation

Referring to FIGS. 5, 6, 7, 8, 9, 10, 11, and 12, the operation of the unique garden-border system comprises the following steps:
1) Inserting each end of garden-bed strips 55 into one of strip recesses 54, respectively, to align staircase-forming openings 56 with pin holes 53;
2) Adjusting garden-bed strips 55 to desired positions and elevations, respectively, to eliminate all the gaps (such as gaps 49 and 50 in figures PRIOR ART A and B) between gap-eliminating couplers 51, garden-bed strips 55, and the ground, respectively, to prevent soil and water from leaking out through the gaps;
3) Pushing multi-function locking pins 58 into pin holes 53, respectively, to snap-lock garden-bed strips 55 to gap-eliminating couplers 51; and
4) Inserting anti-sliding V-shaped stakes 60 through slanted-stake tunnels 52 and into the ground to insert underground-interlocking anchors 61 into the ground, respectively, to interlock gap-eliminating couplers 51 and garden-bed strips 55 with the ground:
    a) To create a desired shape and elevation of the unique garden-border system,
    b) To interlock the unique garden-border system with the ground,
    c) To create a desired shape and elevation of a garden bed,
    d) To interlock a garden bed with the ground,
    e) To eliminate all the gaps (such as gaps 49 and 50 in figures PRIOR ART A and B), to prevent soil and water from leaking out through them,
    f) To prevent the unique garden-border system and a garden bed from sliding downwards,
    g) To retain the intended shape, location, and elevation of the unique garden-border system and a garden bed, and
    h) To eliminate the problem of soil and water leaking out through all the gaps (such as gaps 49 and 50 in figures PRIOR ART A and B), which weakens the foundation of a garden bed, reduces the growth rate of plants, distorts the intended shape of the unique garden-border system and a garden bed, and shifts the unique garden-border system and a garden bed.

Benefit

Referring to FIGS. 5, 6, 7, 8, 9, 10, 11, 12, 13, 14, and 15:

1) The unique garden-border system provides a system, which eliminates the gaps (such as gaps 49 and 50 in figures PRIOR ART A and B) between gap-eliminating couplers 51, garden-bed strips 55, and the ground, to prevent soil and water from leaking out through them (see FIGS. 10, 11, and 12).
2) The unique garden-border system provides anti-sliding V-shaped stakes 60, which prevent the unique garden-border system and a garden bed from sliding downwards, to retain the intended shape, location, and elevation of the unique garden-border system and a garden bed (see FIGS. 10, 11, and 12).
3) The unique garden-border system provides underground-interlocking anchors 61, which interlock gap-eliminating couplers 51 and garden-bed strips 55 with the ground, to prevent the unique garden-border system and a garden bed from sliding downwards, to retain the intended shape, location, and elevation of the unique garden-border system and a garden bed (see FIGS. 10, 11, and 12).
4) The unique garden-border system provides staircase-forming openings 56, which allow garden-bed strips 55 to be positioned and elevated, respectively, to create a staircase-like shape and elevation of the unique garden-border system and a garden bed (see FIGS. 13 and 14).
5) The unique garden-border system provides swing-preventing teeth 57, which lock gap-eliminating couplers 51 and garden-bed strips 55 in desired positions and elevations, respectively, creating many unique shapes and elevations for the unique garden-border system and a garden bed (see FIGS. 13 and 14).
6) The unique garden-border system provides multi-function locking pins 58 and one-way-snap-locking wings 59, which snap-lock garden-bed strips 55 to gap-eliminating couplers 51, and snap-lock multi-function locking pins 58 to gap-eliminating couplers 51, to prevent multi-function locking pins 58 from unlocking themselves (see FIGS. 1A and 1B).
7) The unique garden-border system provides a unique beneficial system, which substantially reduces the time and labor needed to build a garden-border system.
8) The unique garden-border system provides a unique beneficial system, which substantially reduces the production and installation costs for a garden border system, and, thus, transfers this saving to consumers to save them substantial amounts of money.

Variation

Figures 1A, 1B:
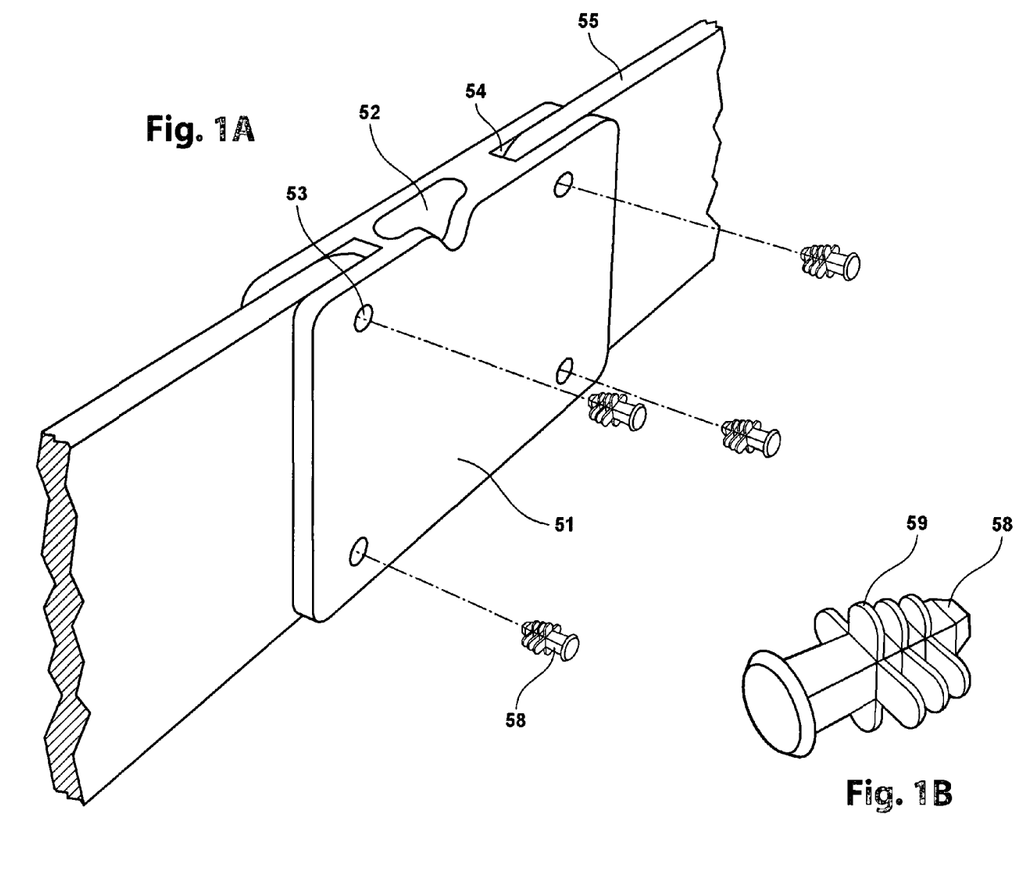
FIGS. 1A and 1B illustrate a perspective view of the unique garden-border system.
Figure 2:
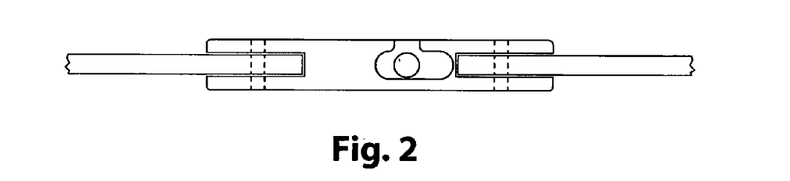
FIG. 2 illustrates a top view of the unique garden-border system.
Figure 3:
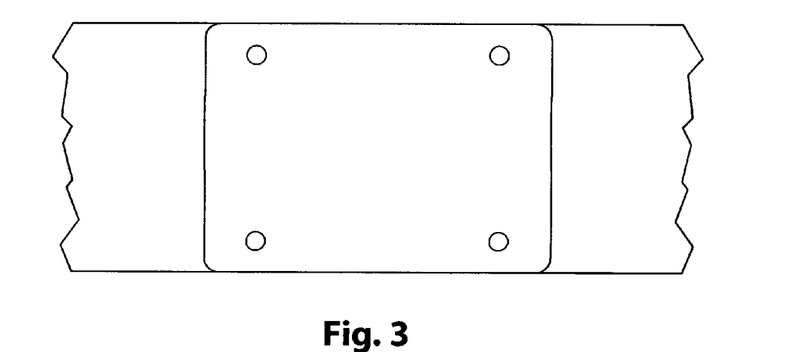
FIGS. 3 and 4 illustrate a side view of the unique garden-border system.
Figure 4:
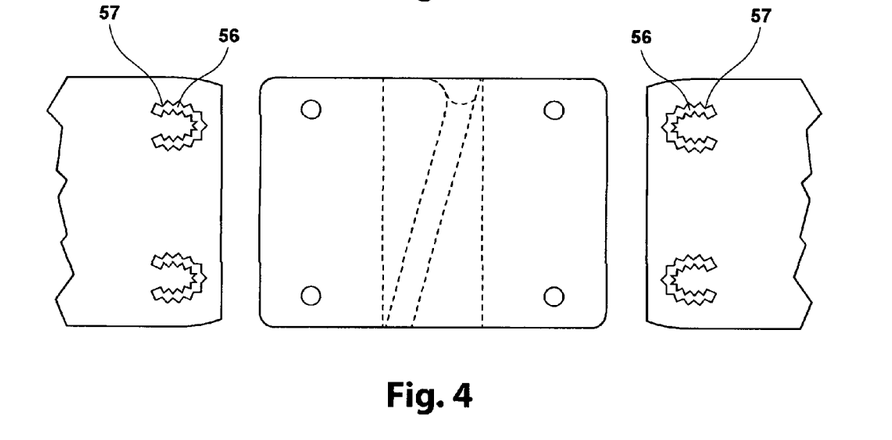
Figure 5:
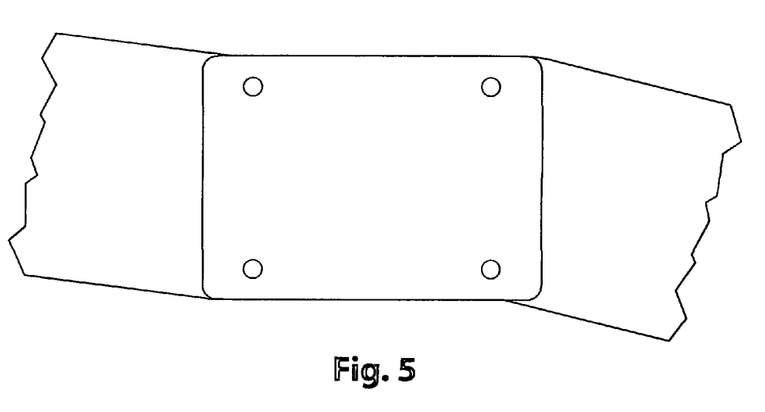
FIGS. 5 and 6 illustrate a side view of a gap-eliminating coupler and garden-bed strips adjusted to different positions and elevations, respectively.
Figure 6:
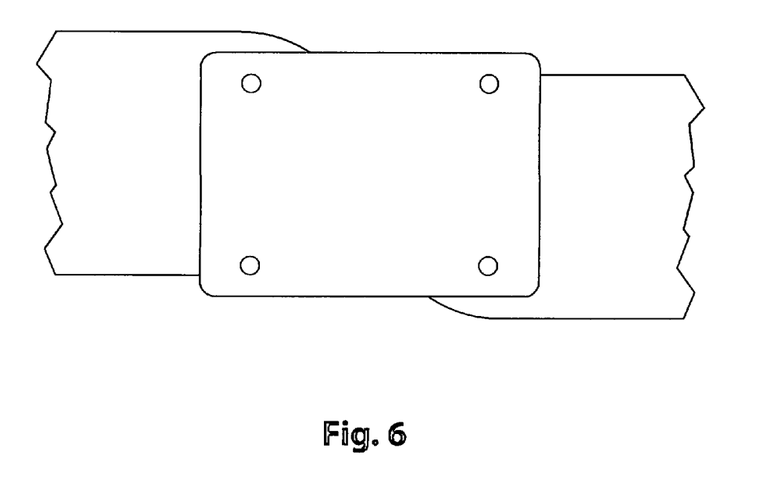
Figure 7:
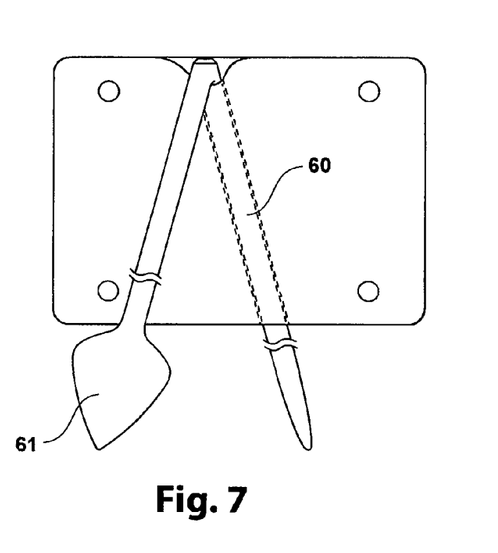
FIGS. 7, 8, and 9 illustrate side and top views of an anti-sliding V-shaped stakes and an underground-interlocking anchor.
Figure 8:
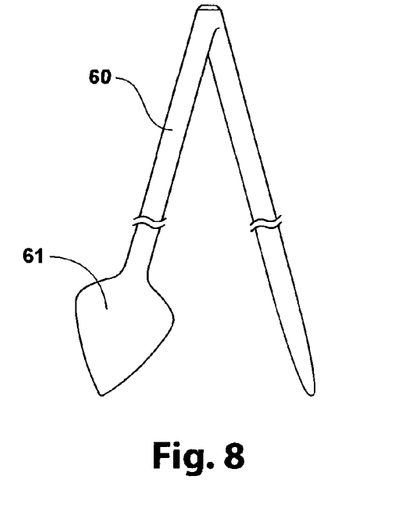
Figure 9:
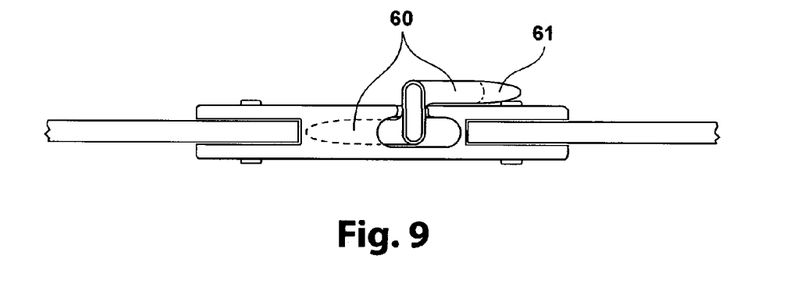
Figure 10:
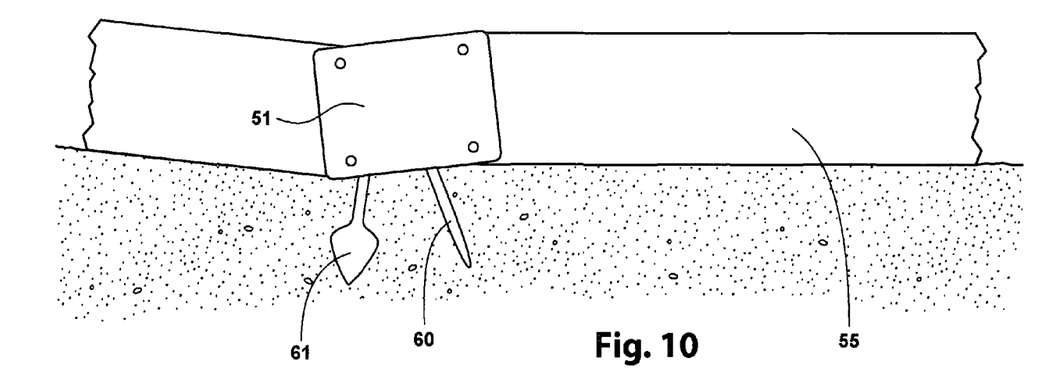
FIGS. 10, 11, and 12 illustrate how a gap-eliminating coupler and garden-bed strips eliminate the gaps between them and the ground.
Figure 11:
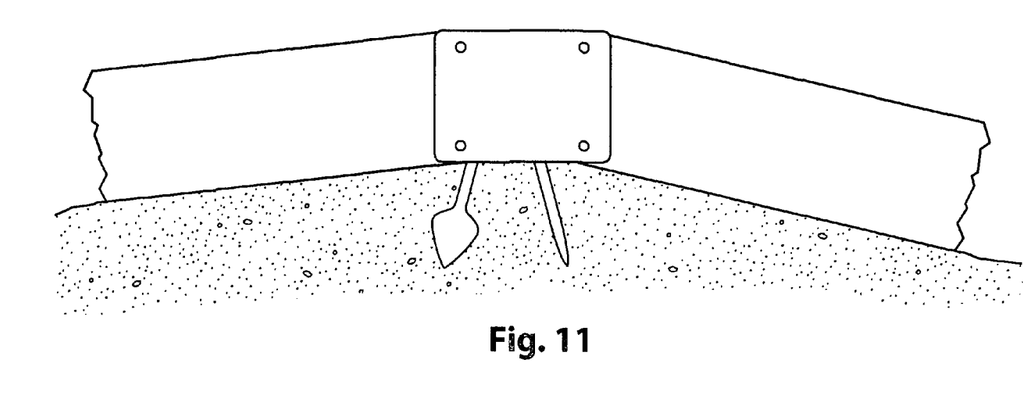
Figure 12:
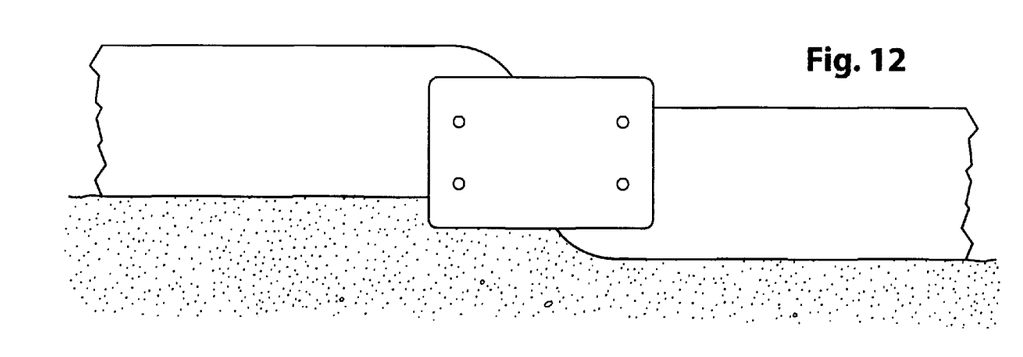
Figure 13:
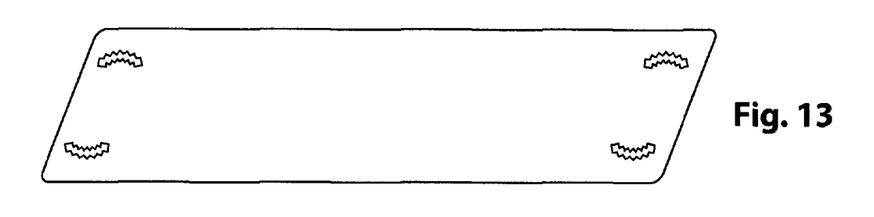
FIGS. 13 and 14 illustrate variations of the garden-bed strip.
Figure 14:
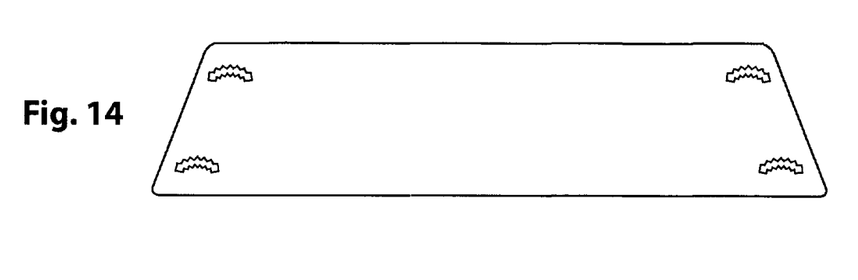
Figure 15:
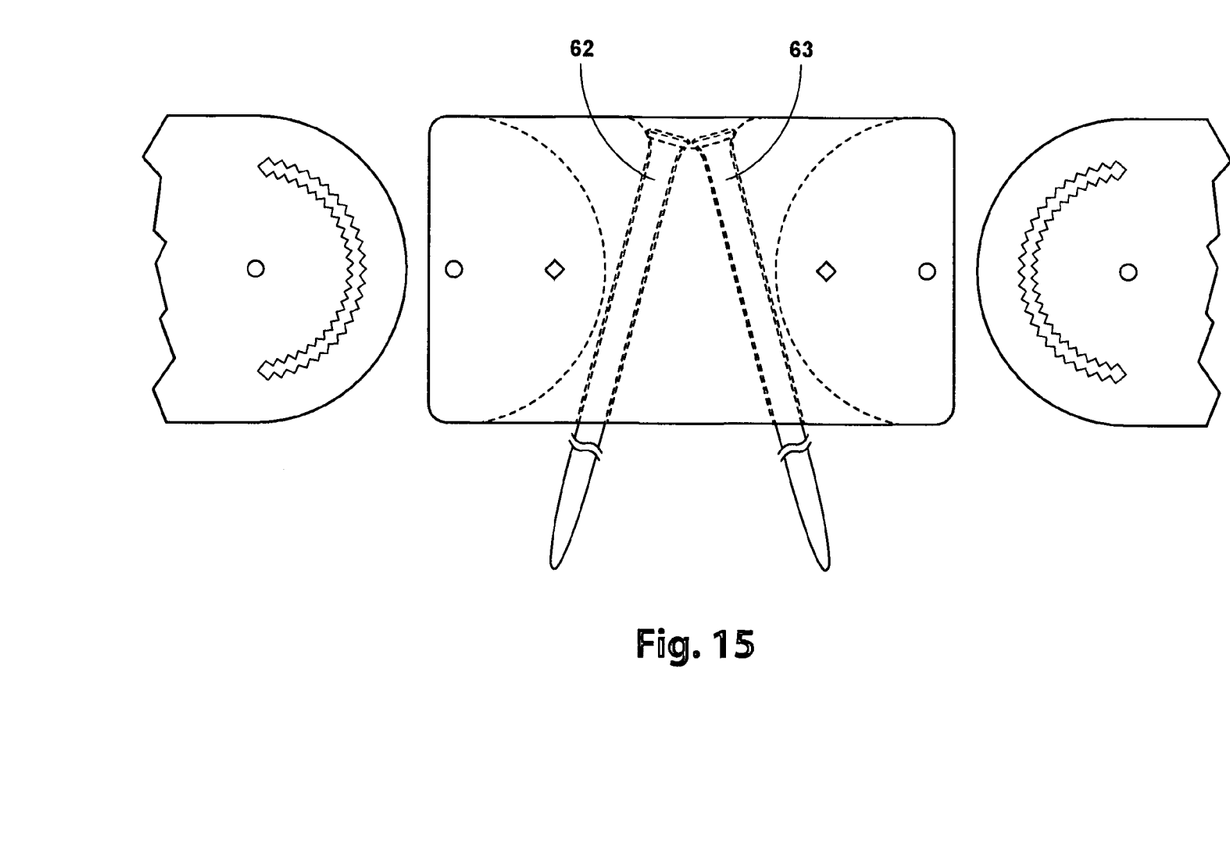
FIGS. 15 and 16 illustrate variations of the gap-eliminating coupler.
Figure 16:
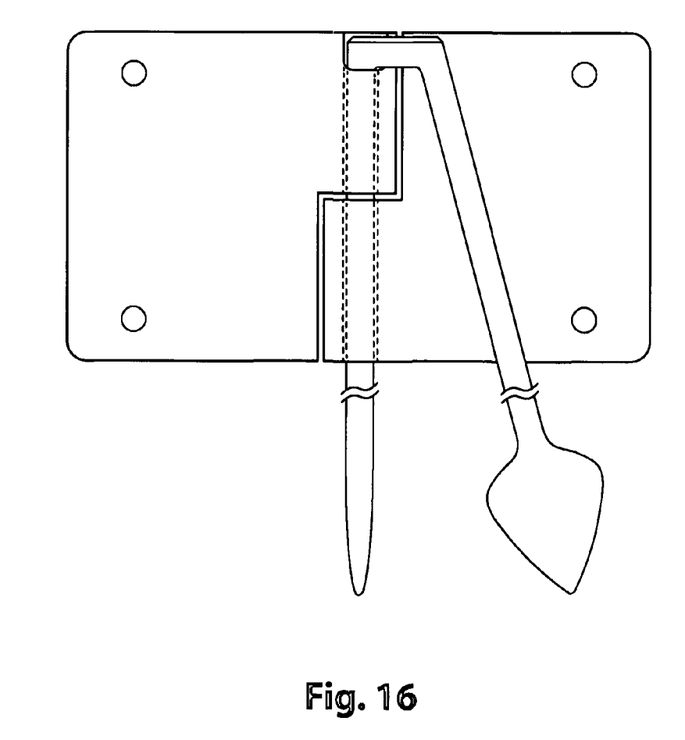
Figure 17:
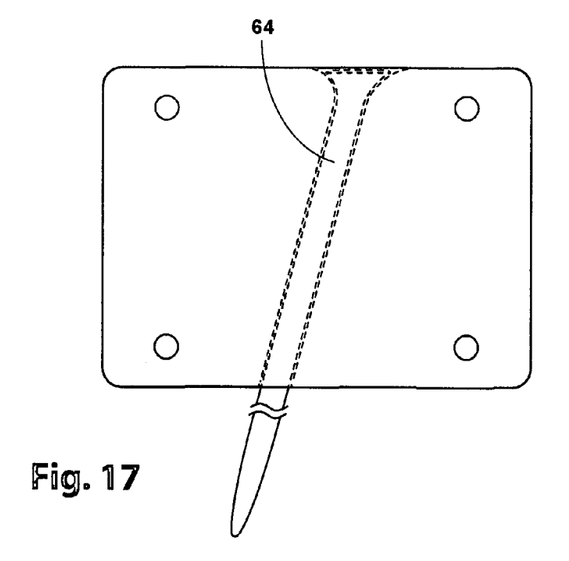
FIGS. 17, 18, 19, 20, 21, and 22 illustrate variations of the anti-sliding V-shaped stakes and the underground-interlocking anchor.
Figure 18:
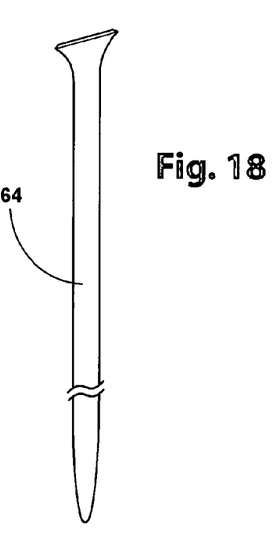
Figure 19:
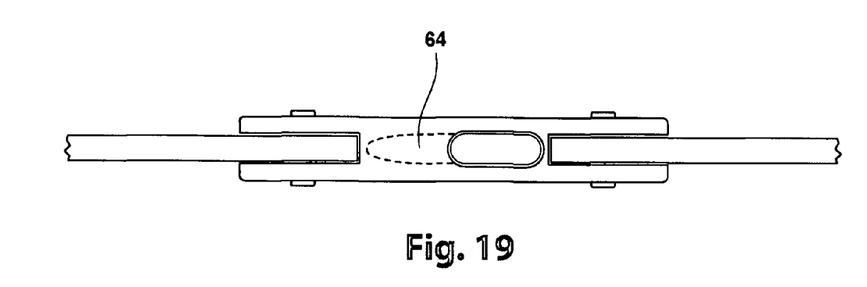
Figures 20, 21, 22:
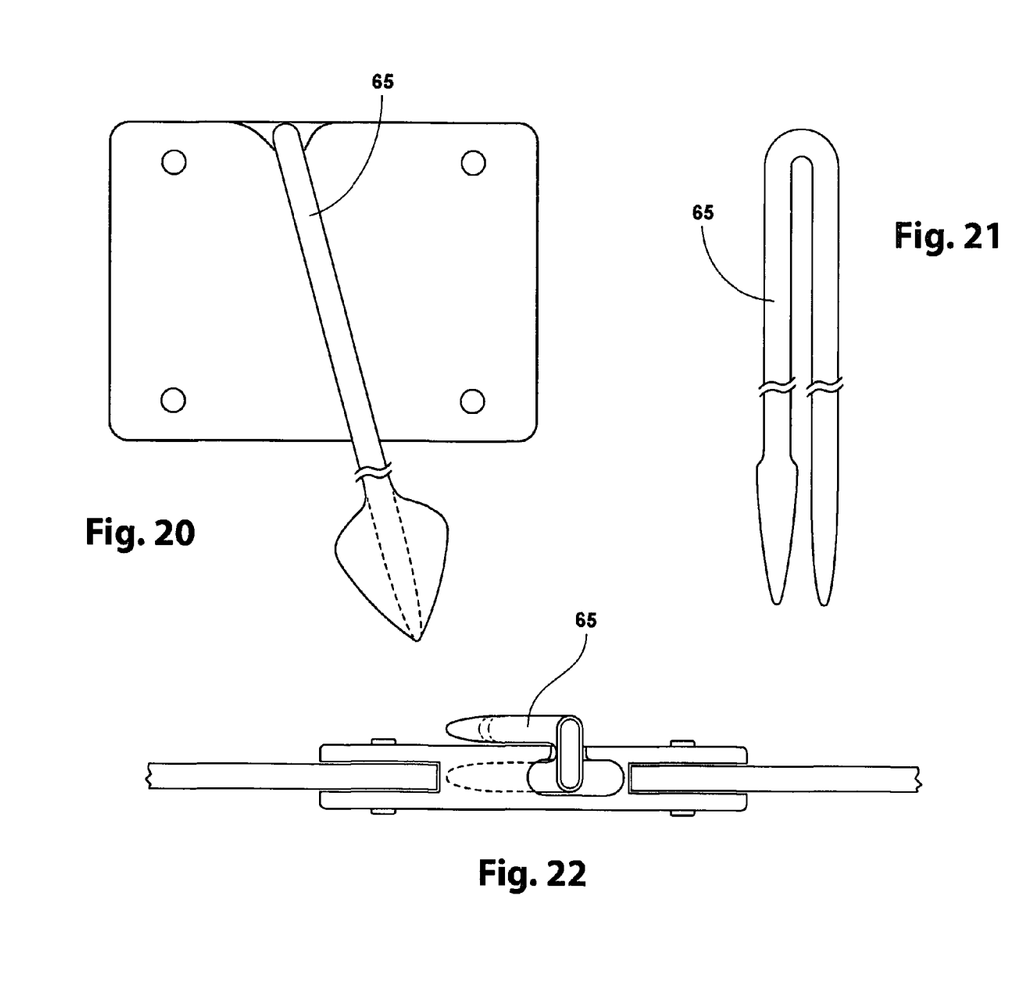

Referring to FIGS. 15-22:

1) Gap-eliminating couplers 51 each can have two slanted and/or straight tunnels molded therein with two I-shaped pins 62 and 63 (see FIG. 15). Gap-eliminating couplers 51 each can have an equivalent of a gap-eliminating hinge coupler (see FIG. 16).
2) Slanted-stake tunnels 52 each can have a round, oval, square, or triangular cross-section.
3) Pin holes 53 each can have a round or square cross-section (see FIG. 15).
4) Strip recesses 54 each can have a rectangular or half-moon shape (see FIG. 15).
5) Garden-bed strips 55 each can have a different shape (see FIGS. 13 and 14).
6) Staircase-forming openings 56 each can have a horse-shoe shape or peanut shape (see FIGS. 4, 13, and 14).
7) Swing-preventing teeth 57 each can have a triangular or square shape (see FIG. 15).
8) Multi-function locking pins 58 each can have a cross-section of square or star-like shape.
9) One-way-snap-locking wings 59 each can have a fan-like or moon-like shape.
10) Anti-sliding V-shaped stakes 60 each can have an equivalent of stakes 62 and 63, or stake 64 (see FIGS. 15, 16, 17, 18, and 19), or U-shaped stake 65 (see FIGS. 20, 21, and 22).
11) Underground-interlocking anchors 61 each can have an arrowhead-like or diamond-like shape (see FIG. 20).

MAJOR ADVANTAGES OF THE INVENTION

The present invention substantially departs from the conventional concepts and designs of the prior art. In doing so, the present invention provides the unique gap-eliminating, underground-anchoring, anti-sliding, staircase-forming, and swing-preventing system of garden border, having many unique and significant features, functions, and advantages, which overcome all the disadvantages of the prior art, as follows:

1) It is an object of the present invention to provide the unique garden-border system having a plurality of multi-function gap-eliminating couplers 51, each of which is capable of, at the same time, performing double-functions of: a) Coupling garden-bed strips 55, and b) Eliminating all the gaps between multi-function gap-eliminating couplers 51, garden-bed strips 55, and the ground to seal the soil and water inside a garden bed within the garden-border system. As a result, this prevents the soil and water from leaking through all the gaps between multi-function gap-eliminating couplers 51, garden-bed strips 55, and the ground, and leaking out of a garden bed.

2) It is another object of the present invention to provide the unique garden-border system having a plurality of underground-interlocking anchors 61, which are capable of interlocking gap-eliminating couplers 51 of the unique garden-border system with the ground. As a result, this prevent gap-eliminating couplers 51 from being pried upwards when garden-bed strips 55 are stepped on and/or when they are affected by weather elements, after an extended period of use.

3) It is a further object of the present invention to provide the unique garden-border system having a plurality of anti-sliding V-shaped stakes 60, which are capable of be inserted through gap-eliminating couplers 51 of the unique garden-border system and through the ground, in desired angles, respectively, and are capable of interlocking the unique garden-border system and the slanted ground. As a result, this prevents the unique garden-border system from sliding down the slanted ground when stepped on and/or when it rains, after an extended period of use.

4) It is an even further object of the present invention to provide the unique garden-border system having a plurality of staircase-forming openings 56 formed in garden-bed strips 55 of the unique garden-border system, which are capable of being repositioned and locked in place to form a staircase-like elevations for garden-bed strips 55 of the unique garden-border system. As a result, this allows people to build a garden bed on a staircase-like slope.

5) It is still another object of the present invention to provide the unique garden-border system having a plurality of swing-preventing teeth 57, which are molded along the edges of staircase-forming openings 56, respectively, to lock garden-bed strips 55 of the unique garden-border system in place, to prevent garden-bed strips 55 from swinging downwards or upwards when stepped on and/or when they are affected by weather elements, after an extended period of use. As a result, this retains the original, intended shape and/or elevation of a garden bed.

6) It is yet another object of the present invention to provide the unique garden-border system having a plurality of multi-function locking pins 58, which are capable of locking swing-preventing teeth 57 of the garden-bed strips in place after garden-bed strips 55 are adjusted to desired positions and elevations, and are capable of locking themselves in place. As a result, this retains the original, intended shape and/or elevation of a garden bed.

7) It is still yet a further object of the present invention to provide the unique garden-border system having a plurality of multi-function locking pins 58, which are capable of being pushed through pin holes 53 of gap-eliminating couplers 51, respectively, and snap-locking themselves in place by one-way-snap-locking wings 59, to eliminate the needs for using screws, screw-drivers, extended time, and substantial labor to build the garden-border system. As a result, this substantially reduces the time and labor needed to build the garden-border system.

8) It is still yet an even further object of the present invention to provide the unique garden-border system, which substantially reduces the production and installation costs for a garden border system, and, thus, transfers this saving to consumers to save them substantial amounts of money.

9) It is still yet another even further object of the present invention to provide the unique garden-border system, which eliminates all the gaps between multi-function gap-eliminating couplers 51, garden-bed strips 55, and the ground to seal the soil and water inside a garden bed within the garden-border system, to eliminate the problem of soil and water leaking out through all the gaps (such as gaps 49 and 50 in figures PRIOR ART A and B), which weakens the foundation of a garden bed, reduces the growth rate of plants, distorts the intended shape of the unique garden-border system and a garden bed, and shifts the unique garden-border system and a garden bed.

What is claimed is:

1. A garden-border system, for forming and anchoring a unique garden bed, comprising:
   a plurality of garden-bed strips, each of said garden-bed strips having two strip ends and a plurality of openings integrated into each of said two strip ends respectively, said openings allowing said garden-bed strips to pivot and ascend or descend around said openings respectively to eliminate gaps between the garden-border system and sloping ground to prevent soil and nutrition from leaking through said gaps to increase the grow rate of plants planted within the garden-border system;
   a plurality of gap-eliminating couplers, each of said gap-eliminating couplers having four corner areas, two coupler ends, a plurality of pin holes, two strip recesses, and at least one slanted-stake tunnel, said pin holes molded into said four corner areas respectively, said two strip recesses molded into said two coupler ends respectively, said at least one slanted-stake tunnel molded into said gap-eliminating couplers between said two strip recesses in an angle, each of said two strip recesses for one of said garden-bed strips to be inserted therein, said gap-eliminating couplers for coupling said garden-bed strips to form said predetermined shape and elevation of the garden-border system;
   a plurality of swing-preventing teeth, each of said openings of said garden-bed strips having a surrounding edge, said swing-preventing teeth molded on each of said surrounding edges respectively;
   a plurality of multi-function locking pins, each of said locking pins having a plurality of one-way-snap-locking wings molded thereon, said locking pins and said one-way-snap-locking wings pushed through said pin holes of said gap-eliminating couplers and through said openings of said garden-bed strips respectively such that said one-way-snap-locking wings engage with said swing-preventing teeth and snap-lock said locking pins in place respectively and such that said swing-preventing teeth prevent said locking pins and said one-way-snap-locking wings from sliding back out of said pin holes and out of said openings respectively, said locking pins for locking said gap-eliminating couplers to said garden-bed strips and for locking said swing-preventing teeth in place to prevent said garden-bed strips from moving respectively;
   a plurality of anti-sliding V-shaped stakes, said anti-sliding V-shaped stakes inserted through said at least one slanted-stake tunnel of said gap-eliminating couplers and into the sloping ground in an angle respectively, said anti-sliding V-shaped stakes for interlocking said gap-eliminating couplers and said garden-bed strips with the sloping ground in an angle, to prevent the garden-border system from being distorted and shifting; and
   a plurality of underground-interlocking anchors, each of said anti-sliding V-shaped stakes having a tip, each of said underground-interlocking anchors molded to said tip, said underground-interlocking anchors inserted into the sloping ground in an angle for interlocking said gap-eliminating couplers and said garden-bed strips with the sloping ground in an angle, to prevent the garden-border system from being distorted and shifting.

2. The garden-border system of claim 1, wherein each of said openings has a horseshoe shape.

3. The garden-border system of claim 1, wherein each of said openings has an elongated curved oval shape.

4. The garden-border system of claim 1, wherein each of said openings has a letter-C shape.

5. The garden-border system of claim 1, wherein the garden-border system has a stepped shape.

6. The garden-border system of claim 1, wherein said snap-locking wings each have a respective free distal end shaped as substantially semi-circular.

7. The garden-border system of claim 1, wherein the garden-border system is sloping.

8. The garden-border system of claim 1, wherein each of said underground-interlocking anchors has an arrowhead-like shape.

9. The garden-border system of claim 1, wherein each of said underground-interlocking anchors has a diamond shape.

10. The garden-border system of claim 1, wherein each of said anti-sliding V-shaped stakes is made of rigid material.

11. The garden-border system of claim 1, wherein each of said anti-sliding V-shaped stakes has a round cross-section.

12. The garden-border system of claim 1, wherein each of said anti-sliding V-shaped stakes has a square cross-section.

13. The garden-border system of claim 1, wherein each of said multi-function locking pins is made of semi-rigid material.

14. The garden-border system of claim 1, wherein each of said multi-function locking pins has a square cross-section.

15. The garden-border system of claim 1, wherein each of said multi-function locking pins has a round cross-section.

16. A garden-border system, comprising:
   a plurality of garden-bed strips, each of said garden-bed strips having two strip ends and a plurality of openings integrated into said two strip ends respectively, said openings each having a curved shape, said garden-bed strips for forming the garden-border system, said openings for allowing said garden-bed strips to pivot and ascend or descend around said openings respectively to eliminate gaps between the garden-border system and the ground to prevent soil and nutrition from leaking through said gaps to increase the grow rate of plants planted within the garden-border system;

a plurality of gap-eliminating couplers, each of said gap-eliminating couplers having four corner areas, two coupler ends, a plurality of pin holes, two strip recesses, and at least one slanted-stake tunnel, said pin holes molded into said four corner areas respectively, said two strip recesses molded into said two coupler ends respectively, said at least one slanted-stake tunnel molded into said gap-eliminating couplers between said two strip recesses in an angle, each of said two strip recesses for one of said garden-bed strips to be inserted therein, said gap-eliminating couplers for coupling said garden-bed strips to form the garden-border system;

a plurality of swing-preventing teeth, each of said openings of said garden-bed strips having a surrounding edge, said swing-preventing teeth molded on each of said surrounding edges respectively;

a plurality of locking pins, each of said locking pins having a plurality of one-way-snap-locking wings molded thereon, said locking pins and said one-way-snap-locking wings pushed through said pin holes of said gap-eliminating couplers and through said openings of said garden-bed strips respectively such that said one-way-snap-locking wings engage with said swing-preventing teeth and snap-lock said locking pins in place respectively and such that said swing-preventing teeth prevent said locking pins and said one-way-snap-locking wings from sliding back out of said pin holes and out of said openings respectively, said locking pins for locking said gap-eliminating couplers to said garden-bed strips and for locking said swing-preventing teeth in place to prevent said garden-bed strips from moving respectively;

a plurality of anti-sliding V-shaped stakes, said anti-sliding V-shaped stakes inserted through said at least one slanted-stake tunnel of said gap-eliminating couplers and into the ground in an angle respectively, said anti-sliding V-shaped stakes for interlocking said gap-eliminating couplers and said garden-bed strips with the ground in an angle, to prevent the garden-border system from being distorted and shifting; and a plurality of underground-interlocking anchors, each of said anti-sliding V-shaped stakes having a tip, each of said underground-interlocking anchors molded to said tip, said underground-interlocking anchors inserted into the ground in an angle for interlocking said gap-eliminating couplers and said garden-bed strips with the ground in an angle, to prevent the garden-border system from being distorted and shifting.

17. The garden-border system of claim 16, wherein each of said openings has a horseshoe shape.

18. The garden-border system of claim 16, wherein each of said openings has a letter-C shape.

19. The garden-border system of claim 16, wherein each of said anti-sliding V-shaped stakes is made of metallic material.

20. The garden-border system of claim 16, wherein each of said anti-sliding V-shaped stakes has a round cross-section.

* * * * *